US012593158B2

(12) United States Patent
Liu et al.

(10) Patent No.: US 12,593,158 B2
(45) Date of Patent: Mar. 31, 2026

(54) LISTENING DEVICE

(71) Applicant: Merry Electronics (Shenzhen) Co., Ltd., ShenZhen (CN)

(72) Inventors: Yi-Po Liu, Taichung (TW); Chien-Cheng Tseng, Taichung (TW); Hun-Yun Tsai, Taichung (TW)

(73) Assignee: Merry Electronics (Shenzhen) Co., Ltd., ShenZhen (CN)

( * ) Notice: Subject to any disclaimer, the term of this patent is extended or adjusted under 35 U.S.C. 154(b) by 273 days.

(21) Appl. No.: 18/500,130

(22) Filed: Nov. 2, 2023

(65) Prior Publication Data

US 2025/0106545 A1 Mar. 27, 2025

(30) Foreign Application Priority Data

Sep. 21, 2023 (TW) ................................ 112136032

(51) Int. Cl.

| | |
|---|---|
| ***H04R 25/00*** | (2006.01) |
| ***H04R 1/02*** | (2006.01) |
| ***H04R 1/08*** | (2006.01) |
| ***H04R 1/10*** | (2006.01) |

(52) U.S. Cl.
CPC ............ *H04R 1/1041* (2013.01); *H04R 1/02* (2013.01); *H04R 1/08* (2013.01); *H04R 1/1008* (2013.01)

(58) Field of Classification Search
CPC .......... H04R 1/02; H04R 1/08; H04R 1/1008; H04R 1/1041; H04R 1/04
USPC .......................................................... 381/367
See application file for complete search history.

(56) References Cited

U.S. PATENT DOCUMENTS

2018/0288515 A1* 10/2018 Peterson ................ G01D 5/241

* cited by examiner

*Primary Examiner* — Phylesha Dabney
(74) *Attorney, Agent, or Firm* — JCIPRNET

(57) ABSTRACT

A listening device includes a housing and a circuit board assembly. The housing includes at least one sound outlet. The circuit board assembly is disposed on the housing and includes a microphone, a proximity sensing chip, and a proximity sensing pattern. The microphone and the proximity sensing chip are close to each other and are disposed in a first area of the circuit board assembly. The proximity sensing pattern is disposed in a second area of the circuit board assembly. The second area is connected to the first area. The proximity sensing pattern surrounds and is staggered with the at least one sound outlet.

9 Claims, 7 Drawing Sheets

LISTENING DEVICE

CROSS-REFERENCE TO RELATED APPLICATION

This application claims the priority benefit of Taiwan application serial no. 112136032, filed on Sep. 21, 2023. The entirety of the above-mentioned patent application is hereby incorporated by reference herein and made a part of this specification.

BACKGROUND

Technical Field

The disclosure relates to a listening device, and in particular to, a listening device that combines a wearing detection function with a sound collection or noise cancellation function.

Description of Related Art

With the diverse needs of users, the headphones currently on the market require more and more functions. It is the research direction in the art on how to provide diverse functions within limited space and cost.

SUMMARY

The disclosure provides a listening device, which may dispose a proximity sensing chip, a proximity sensing pattern, and a microphone on the same circuit board assembly to reduce occupied space and cost and provide wearing detection and sound collection or noise cancellation functions.

A listening device of the disclosure includes a housing and a circuit board assembly. The housing includes at least one sound outlet. The circuit board assembly is disposed on the housing and includes a microphone, a proximity sensing chip, and a proximity sensing pattern. The microphone and the proximity sensing chip are close to each other and are disposed in a first area of the circuit board assembly. The proximity sensing pattern is disposed in a second area of the circuit board assembly. The second area is connected to the first area. The proximity sensing pattern surrounds and is staggered with the at least one sound outlet.

In an embodiment of the disclosure, the circuit board assembly includes a sensing layer, and the microphone, the proximity sensing chip, and the proximity sensing pattern are disposed on the sensing layer.

In an embodiment of the disclosure, the circuit board assembly further includes a reference ground layer disposed below the sensing layer. The reference ground layer includes a microphone power circuit and a system ground plane electrically connected to the microphone. Projections of the microphone power circuit and the system ground plane onto a plane where the sensing layer is located overlap the first area.

In an embodiment of the disclosure, the reference ground layer includes a first ground layer and a second ground layer. The second ground layer is disposed below the first ground layer. The second ground layer is electrically connected to the first ground layer. The microphone power circuit and system ground plane are disposed on the second ground layer.

In an embodiment of the disclosure, the circuit board assembly further includes a correction layer disposed below the reference ground layer. The correction layer includes an environmental parameter sensing circuit electrically connected to the proximity sensing chip.

In an embodiment of the disclosure, a projection of the environmental parameter sensing circuit onto the plane where the sensing layer is located overlaps the second area.

In an embodiment of the disclosure, the second area is in a C-shape, and the first area where the microphone and the proximity sensing chip are disposed extends from a gap of the second area to a center of the C-shape, so that the second area and a portion of the first area together form a closed ring shape.

In an embodiment of the disclosure, the microphone is disposed at a central position above the housing.

In an embodiment of the disclosure, the at least one sound outlet includes a plurality of sound outlets arranged in a ring shape. The proximity sensing pattern includes an inner ring, an outer ring surrounding the inner ring, and a plurality of connecting parts connecting the inner ring and the outer ring. The inner ring is located on inner sides of the sound outlets, the outer ring is located on outer sides of the sound outlets, and the connecting parts are located between the sound outlets, so that the proximity sensing pattern surrounds the sound outlets.

In an embodiment of the disclosure, a width of the outer ring is greater than or equal to a width of the inner ring.

Based on the above, the listening device of the disclosure uniformly integrates the proximity sensing pattern, proximity sensing chip, and microphone on the same circuit board assembly without needing to separately dispose them on different circuit boards to reduce overall occupied space and cost, simplify production and assembly processes, and provide wearing detection and sound collection or noise cancellation functions. In addition, the microphone and the proximity sensing chip are close to each other and are disposed in the first area of the circuit board assembly. The proximity sensing pattern is disposed in the second area of the circuit board assembly. The design of the proximity sensing pattern surrounding and being staggered with the sound outlet can achieve an optimized spatial layout.

DESCRIPTION OF THE EMBODIMENTS

Figure 1:
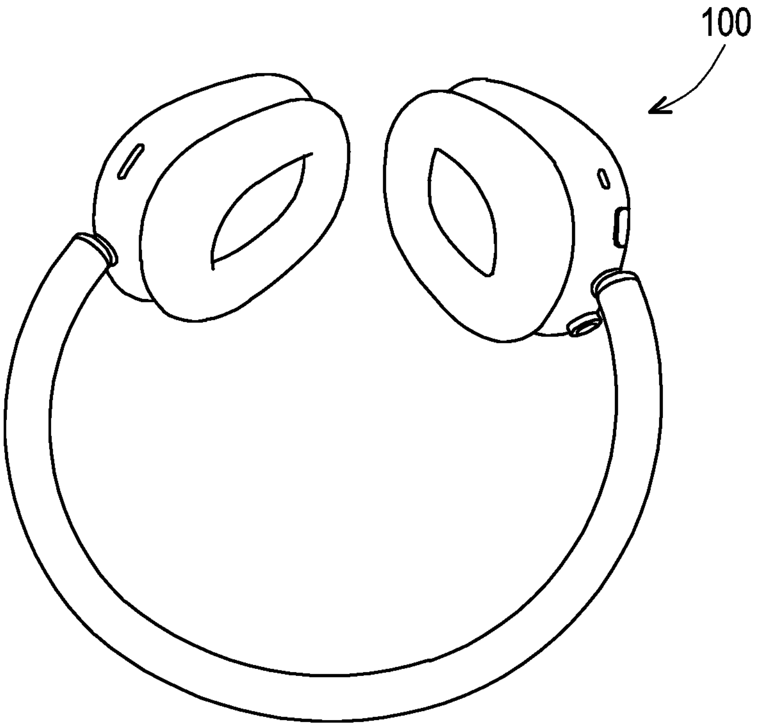
FIG. 1 is a partial schematic diagram of an appearance of a listening device according to an embodiment of the disclosure.

FIG. 1 is a partial schematic diagram of an appearance of a listening device according to an embodiment of the disclosure. Please refer to FIG. 1. In the embodiment, a listening device 100 takes a headphone as an example. However, in other embodiments, the listening device 100 may also be a hearing aid, a virtual reality device, a mixed reality device, an augmented reality device, or an extended reality device, and the type of the listening device 100 is not limited thereto.

In order to achieve the effect of wearing detection, conventional devices need to be disposed with infrared sensors, mechanical detection switches, or skin detectors to determine the wearing status, which requires corresponding high-cost mechanical designs. The listening device 100 of the embodiment may integrate components within the listening device 100 to achieve wearing detection while having favorable sound collection or noise cancellation functions, thereby effectively reducing cost and occupied space, which will be explained below.

Figure 2:
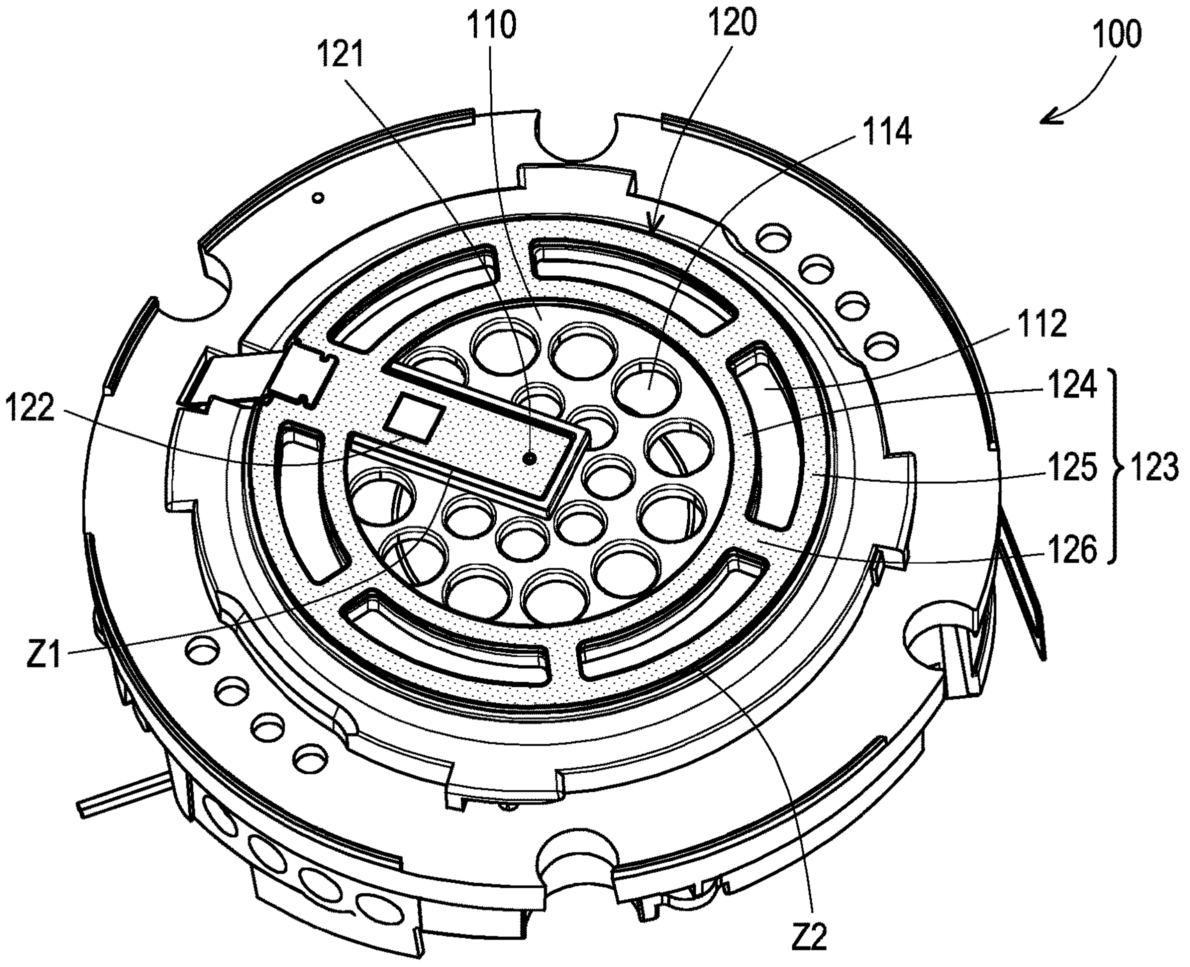
FIG. 2 is an internal schematic diagram of the listening device of FIG. 1.

FIG. 2 is an internal schematic diagram of the listening device of FIG. 1. Referring to FIG. 2, the listening device 100 of the embodiment includes a housing 110 and a circuit board assembly 120. The housing 110 includes at least one sound outlet 112 and at least one sound outlet 114. In the embodiment, the housing 110 includes a plurality of sound outlets 114 located in the center and a plurality of sound outlets 112 arranged in a ring shape and surrounding the sound outlets 114.

The circuit board assembly 120 is disposed on the housing 110. The circuit board assembly 120 includes a microphone 121, a proximity sensing chip 122, and a proximity sensing pattern 123. The microphone 121 is, for example, an active noise cancelling microphone. The proximity sensing chip 122 is, for example, a capacitive sensing chip. The microphone 121 and the proximity sensing chip 122 are close to each other and are disposed in a first area Z1 of the circuit board assembly 120. The proximity sensing pattern 123 is disposed in a second area Z2 of the circuit board assembly 120. The second area Z2 is connected to the first area Z1.

In the embodiment, the second area Z2 is in a C-shape and is located on outer sides of the sound outlets 112. The first area Z1 where the microphone 121 and the proximity sensing chip 122 are disposed extends from a gap of the second area Z2 to the center of the C shape, so that the second area Z2 and a portion of the first area Z1 together form a closed ring shape. The microphone 121 is disposed at a central position above the housing 110 to achieve a better sound collection effect and effectively improve the noise cancellation capability of the listening device 100. In the embodiment, the first area Z1 is in a rectangular shape, but is not limited thereto.

As shown in FIG. 2, in the embodiment, the proximity sensing pattern 123 surrounds and is staggered with the sound outlets 112. Specifically, the proximity sensing pattern 123 includes an inner ring 124, an outer ring 125 surrounding the inner ring 124, and a plurality of connecting parts 126 connecting the inner ring 124 and the outer ring 125. The sound outlets 112 are plural and are arranged in a ring shape. The inner ring 124 is located on inner sides of the sound outlets 112, the outer ring 125 is located on the outer sides of the sound outlets 112, and the connecting parts 126 are located between the sound outlets 112, so that the proximity sensing pattern 123 surrounds the sound outlets 112.

Figure 7A:
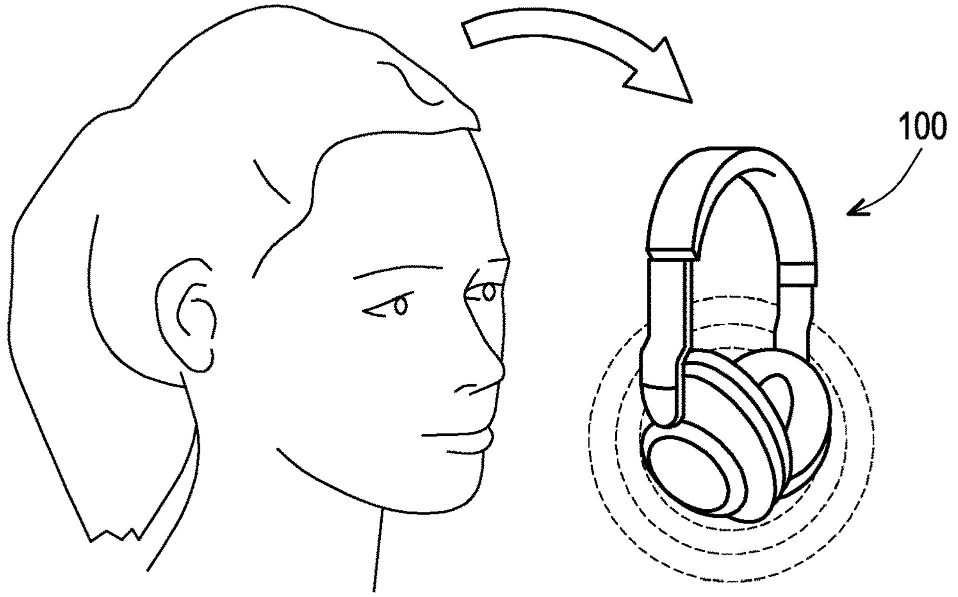
FIG. 7A is a schematic diagram of the listening device of FIG. 1 being taken off.
Figure 7B:
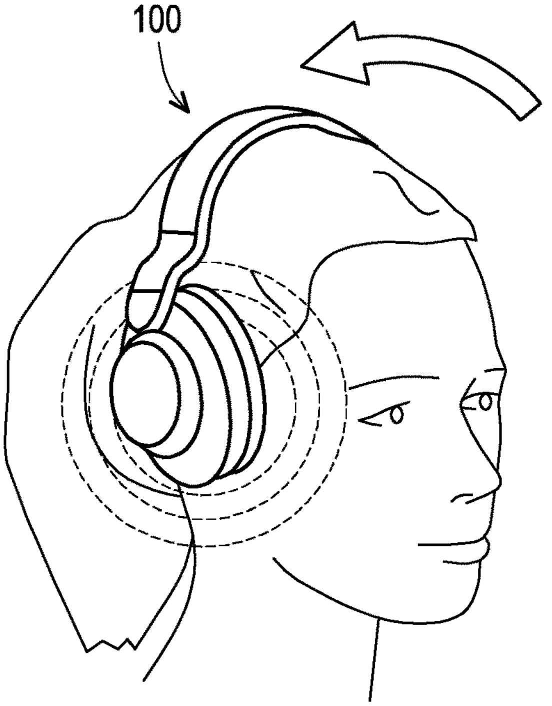
FIG. 7B is a schematic diagram of the listening device of FIG. 1 being worn.

The proximity sensing pattern 123 is configured to sense whether the listening device 100 is worn on the user's head (as shown in FIG. 7B). In the embodiment, a width of the outer ring 125 is equal to a width of the inner ring 124, but in other embodiments, the outer ring 125 may also extend outward, so that the width of the outer ring 125 may also be greater than the width of the inner ring 124 to increase the sensing area and improve sensing performance.

In the embodiment, the circuit board assembly 120 includes, for example, a four-layer board with a sensing layer L1 (FIG. 3), a first ground layer L2 (FIG. 4), a second ground layer L3 (FIG. 5), and a correction layer L4 (FIG. 6) stacked in sequence. The sensing layer L1 (FIG. 3), the first ground layer L2 (FIG. 4), the second ground layer L3 (FIG. 5), and the correction layer L4 (FIG. 6) are connected through via holes. Certainly, the type and number of layers of the circuit board assembly 120 are not limited thereto. Each layer will be introduced one by one below.

Figure 3:
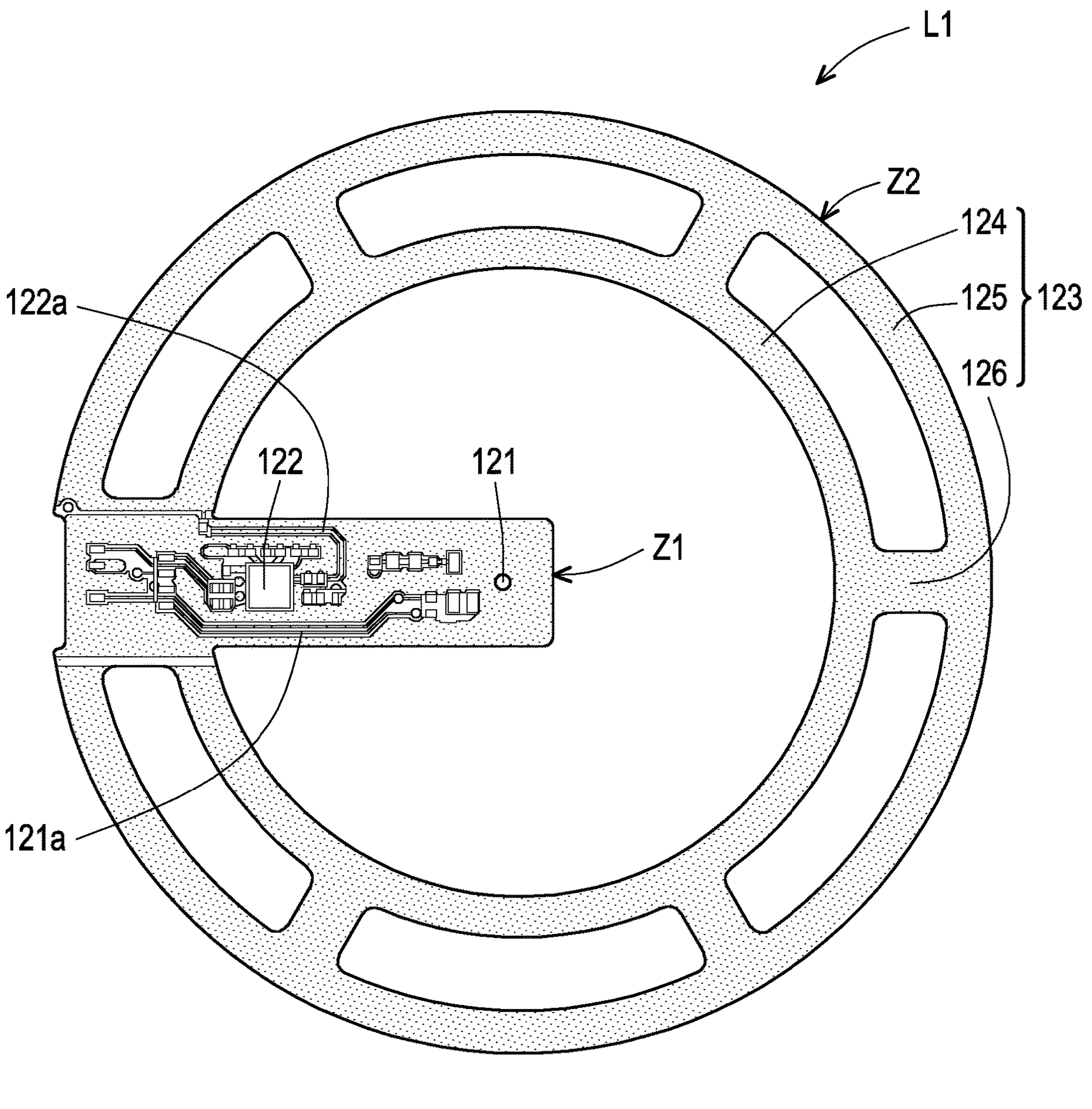
FIG. 3 is a schematic diagram of a sensing layer of a circuit board assembly of the listening device of FIG. 1.

FIG. 3 is a schematic diagram of a sensing layer of a circuit board assembly of the listening device of FIG. 1. Please refer to FIG. 3. In the embodiment, the microphone 121, a microphone signal line 121*a*, the proximity sensing chip 122, a chip circuit 122*a*, and the proximity sensing pattern 123 are disposed on the sensing layer L1. The microphone signal line 121*a* is electrically connected to the microphone 121, and the chip circuit 122*a* is electrically connected to the proximity sensing chip 122. In the embodiment, the designer may plan the position of the microphone 121 and the positions of the sound outlets 112 and 114 (FIG. 2) for optimal active noise cancellation according to the acoustic structure and the active noise cancellation algorithm, and maximize the proximity sensing pattern 123 so as to better improve a distance range of wearing detection.

Figure 4:
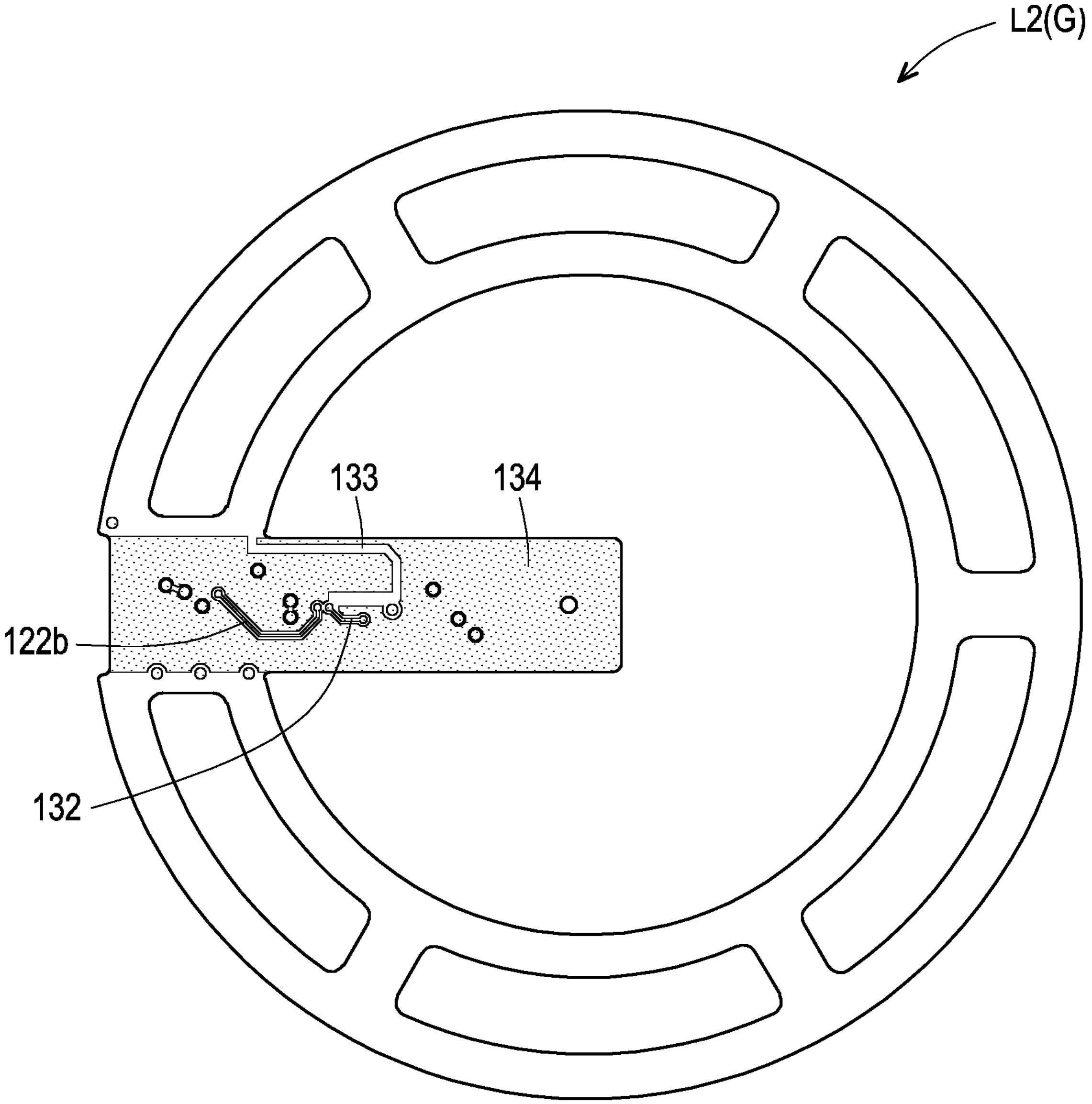
FIG. 4 is a schematic diagram of a first ground layer of a reference ground layer of the circuit board assembly of the listening device of FIG. 1.
Figure 5:
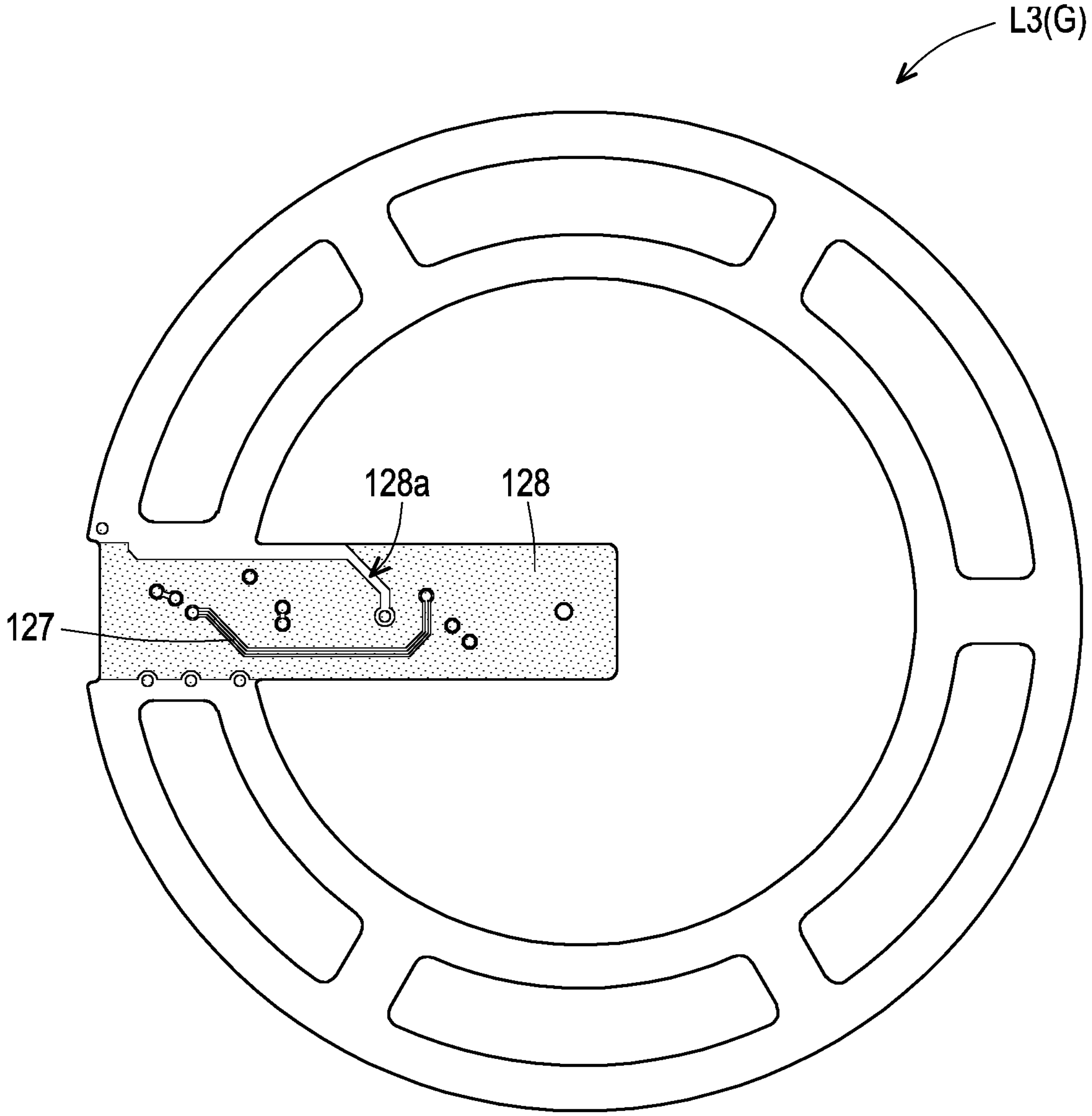
FIG. 5 is a schematic diagram of a second ground layer of a reference ground layer of the circuit board assembly of the listening device of FIG. 1.

FIG. 4 is a schematic diagram of a first ground layer of a reference ground layer of the circuit board assembly of the listening device of FIG. 1. FIG. 5 is a schematic diagram of a second ground layer of a reference ground layer of the circuit board assembly of the listening device of FIG. 1. Please refer to FIG. 4 and FIG. 5. In the embodiment, the circuit board assembly 120 includes a reference ground layer G disposed below the sensing layer L1. Specifically, in the embodiment, the reference ground layer G includes the first ground layer L2 (FIG. 4) and the second ground layer L3 (FIG. 5). The second ground layer L3 is disposed below the first ground layer L2. The second ground layer L3 is electrically connected to the first ground layer L2. Certainly, in other embodiments, the number of the reference ground layer G is not limited thereto.

As shown in FIG. 4, the first ground layer L2 includes a hollow area 133 corresponding to the chip circuit 122*a* of the sensing layer L1, a chip circuit 122*b*, an environmental parameter sensing circuit 132, and a system ground plane 134. The chip circuit 122*b* and the environmental parameter sensing circuit 132 are electrically connected to the proximity sensing chip 122.

As shown in FIG. 5, the reference ground layer G includes a microphone power circuit 127 and a system ground plane 128 that are electrically connected to the microphone 121. The microphone power circuit 127 and the system ground plane 128 are disposed on the second ground layer L3. It can be seen from FIG. 3 and FIG. 5 that projections of the microphone power circuit 127 and the system ground plane 128 onto the plane where the sensing layer L1 is located overlap the first area Z1 (FIG. 3).

In the embodiment, the reference ground layer G is configured to isolate the proximity sensing pattern 123 (FIG. 3) and the microphone power circuit 127 to prevent the parasitic capacitance and floating voltage of the analog signal of the microphone power circuit 127 from interfering with the operation of the proximity sensing pattern 123.

Figure 6:
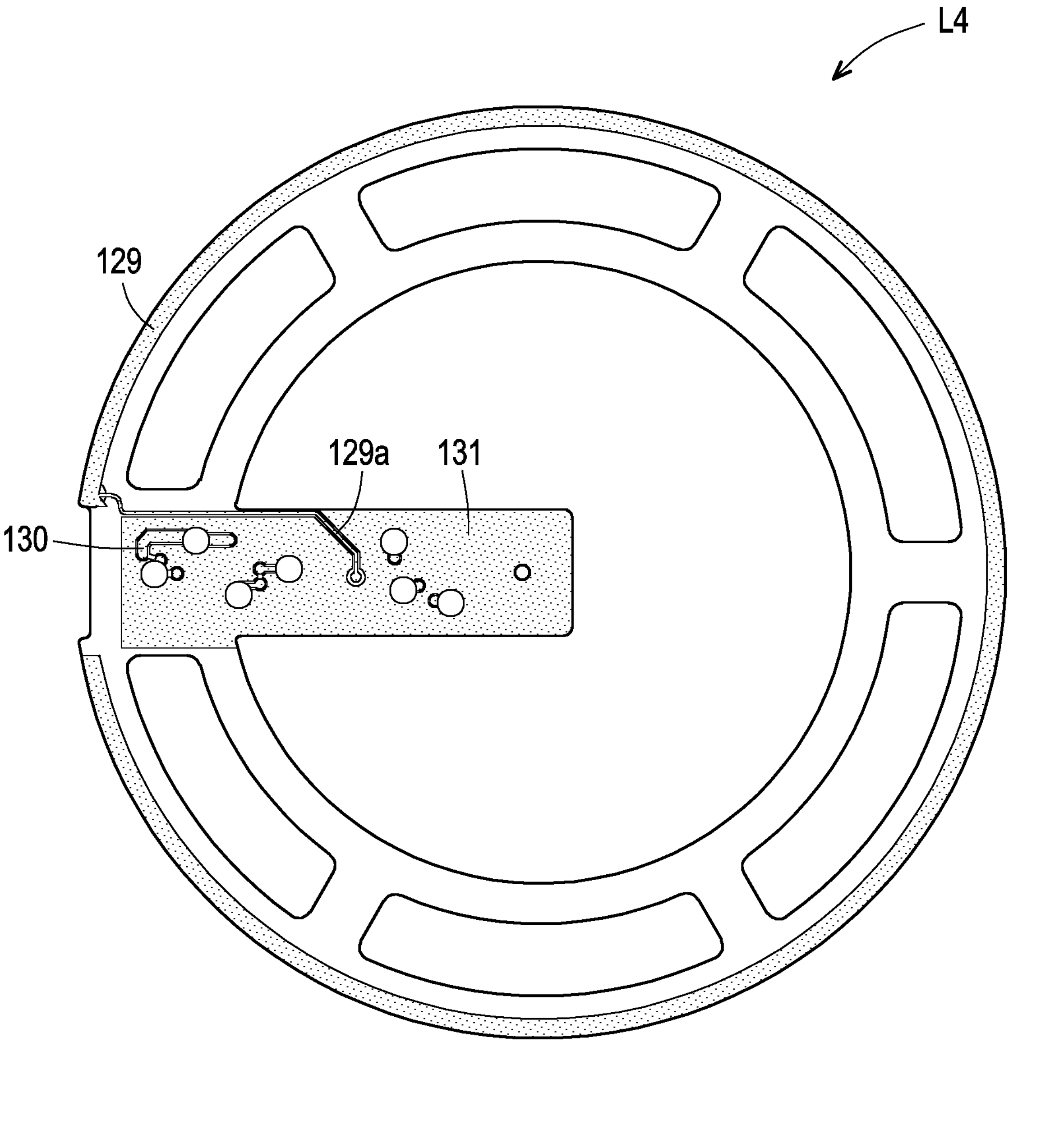
FIG. 6 is a schematic diagram of a correction layer of a circuit board assembly of the listening device of FIG. 1.

FIG. 6 is a schematic diagram of a correction layer of a circuit board assembly of the listening device of FIG. 1.

Please refer to FIG. 6. In the embodiment, the correction layer L4 is disposed below the reference ground layer G. The correction layer L4 includes an environmental parameter sensing circuit 129 and an environmental parameter sensing circuit 129*a* electrically connected to the proximity sensing chip 122 (FIG. 3). A projection of the environmental parameter sensing circuit 129 onto the plane where the sensing layer L1 is located overlaps the second area Z2 (FIG. 3), and a projection of the environmental parameter sensing circuit 129*a* onto the plane where the sensing layer L1 is located overlaps the first area Z1 (FIG. 3). The environmental parameter sensing circuits 129 and 129*a* are capacitive sensing correction and compensation circuits, which are configured to correct and compensate the listening device 100 due to changes in ambient temperature/humidity or the temperature/humidity worn on the ears so that the influence of the changes in ambient temperature/humidity on the proximity sensing function can be reduced.

In addition, the correction layer L4 also includes a proximity sensing chip power circuit 130 and a system ground plane 131. Projections of the proximity sensing chip power circuit 130 and the system ground plane 131 onto the plane where the sensing layer L1 is located overlap the first area Z1. The proximity sensing chip power circuit 130 is electrically connected to the proximity sensing chip 122 of FIG. 3 through the via holes.

As can be seen from FIG. 5, the second ground layer L3 also includes a hollow area 128*a* corresponding to the first area Z1, and the position of the hollow area 128*a* corresponds to the environmental parameter sensing circuit 129*a* of FIG. 6.

The listening device 100 of the embodiment uniformly integrates the proximity sensing chip 122 and the proximity sensing pattern 123 for wearing detection, the microphone 121, and the microphone power circuit 127 on the same circuit board assembly 120. Since the proximity sensing pattern 123, the proximity sensing chip 122, the microphone 121, and the microphone power circuit 127 do not need to be separately disposed on different circuit boards, the required circuit boards and cost can be reduced and the production and assembly processes can be simplified to reduce the overall production cost. In addition, the listening device 100 of the embodiment designs the distribution position of the proximity sensing pattern 123 according to the housing 110 of the acoustic cavity, so that the design has maximum flexibility and achieves an optimized spatial layout.

FIG. 7A is a schematic diagram of the listening device of FIG. 1 being taken off. FIG. 7B is a schematic diagram of the listening device of FIG. 1 being worn. Table 1 (table below) is a comparison table of the proximity sensing values when the listening device 100 is taken off and the proximity sensing values when the listening device 100 is worn.

Please refer to FIG. 7A, FIG. 7B, and Table 1. It can be seen from Table 1 that the proximity sensing values when the listening device 100 is taken off are generally higher than 705, and the proximity sensing values when the listening device 100 is worn is generally between 667 and 689. The listening device 100 may determine whether the status of the listening device 100 is being taken off or worn based on whether the proximity sensing values measured when the listening device 100 is taken off or worn is higher or lower than a threshold.

TABLE 1

| Proximity sensing values when the listening device 100 is taken off | Proximity sensing values when the listening device 100 is worn |
|---|---|
| 710 | 679 |
| 709 | 677 |
| 711 | 676 |
| 708 | 678 |
| 709 | 679 |
| 705 | 669 |
| 705 | 685 |
| 719 | 689 |

In addition, Table 2 (table below) is a comparison table of the power consumption of the listening device 100 of the embodiment that uses wearing detection and the power consumption of a conventional device that does not use wearing detection. Assume that the battery capacity of the listening device is 420 mAh, in a conventional device that does not use wearing detection, when the user removes the listening device without turning off the power in the context of playing music, after about 23.6 hours, the conventional device may consume all the battery power. From Table 2, it can be seen that under the same usage scenario, the power consumption of the listening device 100 of the embodiment is very low to an extent that can be almost ignored due to the introduction of the wearing detection function.

TABLE 2

| | Power consumption of the listening device 100 of the embodiment | Power consumption of a conventional device without using wearing detection | Improved difference |
|---|---|---|---|
| Music being played | 17.82 mA | 17.82 mA | 0 |
| The listening device 100 being taken off | 15.43 mA | 17.82 mA | 2.39 mA |
| Entering standby mode in 30 seconds | 10.82 mA | 17.82 mA | 6.9 mA |
| Entering sleep mode in 300 seconds | 0.0153 mA | 17.82 mA | 17.8047 mA |

That is to say, the listening device 100 of the embodiment not only integrates the proximity sensing pattern 123 and the proximity sensing chip 122 for wearing detection, and the microphone 121 uniformly on the same circuit board assembly 120, but also the performance in wearing detection is very favorable and the power consumption is very low in addition to reducing the required circuit boards and cost.

To sum up, the listening device of the disclosure uniformly integrates the proximity sensing pattern, proximity sensing chip, and microphone on the same circuit board assembly, without needing to separately dispose them on different circuit boards to reduce overall occupied space and cost, simplify production and assembly processes, and provide wearing detection and sound collection or noise cancellation functions. In addition, the microphone and the proximity sensing chip are close to each other and are disposed in the first area of the circuit board assembly. The proximity sensing pattern is disposed in the second area of the circuit board assembly. The design of the proximity sensing pattern surrounding and being staggered with the sound outlet can achieve an optimized spatial layout and maximize the sensing area to improve the accuracy of wearing detection.

What is claimed is:

1. A listening device, comprising:

a housing, comprising at least one sound outlet; and a circuit board assembly, disposed on the housing, and comprising a microphone, a proximity sensing chip, and a proximity sensing pattern, wherein the microphone and the proximity sensing chip are close to each other and are disposed in a first area of the circuit board assembly, the proximity sensing pattern is disposed in a second area of the circuit board assembly, the second area is connected to the first area, and the proximity sensing pattern surrounds and is staggered with the at least one sound outlet, wherein the at least one sound outlet comprises a plurality of sound outlets arranged in a ring shape, the proximity sensing pattern comprises an inner ring, an outer ring surrounding the inner ring, and a plurality of connecting parts connecting the inner ring and the outer ring, the inner ring is located on inner sides of the sound outlets, the outer ring is located on outer sides of the sound outlets, and the connecting parts are located between the sound outlets, so that the proximity sensing pattern surrounds the sound outlets.

2. The listening device according to claim 1, wherein the circuit board assembly comprises a sensing layer, and the microphone, the proximity sensing chip, and the proximity sensing pattern are disposed on the sensing layer.

3. The listening device according to claim 2, wherein the circuit board assembly further comprises a reference ground layer disposed below the sensing layer, the reference ground layer comprises a microphone power circuit and a system ground plane electrically connected to the microphone, and projections of the microphone power circuit and the system ground plane onto a plane where the sensing layer is located overlap the first area.

4. The listening device according to claim 3, wherein the reference ground layer comprises a first ground layer and a second ground layer, the second ground layer is disposed below the first ground layer, the second ground layer is electrically connected to the first ground layer, and the microphone power circuit is disposed on the second ground layer.

5. The listening device according to claim 3, wherein the circuit board assembly further comprises a correction layer disposed below the reference ground layer, and the correction layer comprises an environmental parameter sensing circuit electrically connected to the proximity sensing chip.

6. The listening device according to claim 5, wherein a projection of the environmental parameter sensing circuit onto the plane where the sensing layer is located overlaps the second area.

7. The listening device according to claim 1, wherein the second area is in a C-shape, and the first area where the microphone and the proximity sensing chip are disposed extends from a gap of the second area to a center of the C-shape, so that the second area and a portion of the first area together form a closed ring shape.

8. The listening device according to claim 1, wherein the microphone is disposed at a central position above the housing.

9. The listening device according to claim 1, wherein a width of the outer ring is greater than or equal to a width of the inner ring.

* * * * *